United States Patent [19]

Maier et al.

[11] Patent Number: 4,850,601
[45] Date of Patent: Jul. 25, 1989

[54] SEAL

[75] Inventors: Hans P. Maier; Nikolay Vlaykowski, both of VS-Schwenningen, Fed. Rep. of Germany

[73] Assignee: Agintec AG, Zurich, Switzerland

[21] Appl. No.: 25,716

[22] Filed: Mar. 13, 1987

[30] Foreign Application Priority Data

Mar. 21, 1986 [DE] Fed. Rep. of Germany ....... 3609620

[51] Int. Cl.⁴ .............................................. F16J 15/00
[52] U.S. Cl. ..................................... 277/117; 277/166; 277/170; 277/190; 277/227
[58] Field of Search .................... 277/117–122, 277/179, 166, 142, 168, 170, 190, 191, 227, 228

[56] References Cited

U.S. PATENT DOCUMENTS

| | | | |
|---|---|---|---|
| 3,540,740 | 11/1970 | Smith | 277/117 X |
| 3,927,891 | 12/1975 | Larker et al. | 277/190 |
| 3,933,358 | 1/1976 | Hoer | 277/170 |
| 4,368,894 | 1/1983 | Parmann | 277/166 |
| 4,648,740 | 3/1987 | Carlson | 277/170 X |

FOREIGN PATENT DOCUMENTS 8436214.6 3/1985 Fed. Rep. of Germany .

*Primary Examiner*—David Werner
*Attorney, Agent, or Firm*—Foley & Lardner, Schwartz, Jeffery, Schwaab, Mack, Blumenthal & Evans

[57] ABSTRACT

The invention relates to a seal, consisting of an elastomer shaped ring, which is to be pushed onto a cylindrical circumferential surface and supports itself on the latter by a radially acting sealing surface, with an embedded inner ring, consisting of a chamber portion, likewise to be pushed onto the circumferential surface, with a sealing chamber, which surrounds the shaped ring, is undersized relative to the outer contour of the shaped ring and conically widens from the clear inside diameter of the chamber portion toward one face of the chamber portion, and consisting of fastening means which fix the chamber portion with respect to a second surface resting against the face of the chamber portion. For sealing off a cylindrical surface with respect to a second surface standing vertically on the cylindrical axis, it is proposed that the shaped ring have an axially acting sealing surface, preferably lying at right angles to the radially acting sealing surface, for contact with the second surface.

16 Claims, 8 Drawing Sheets

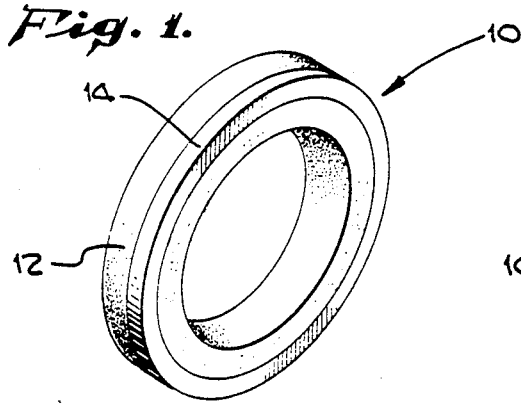
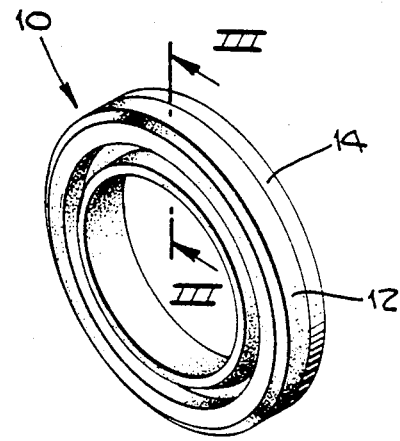
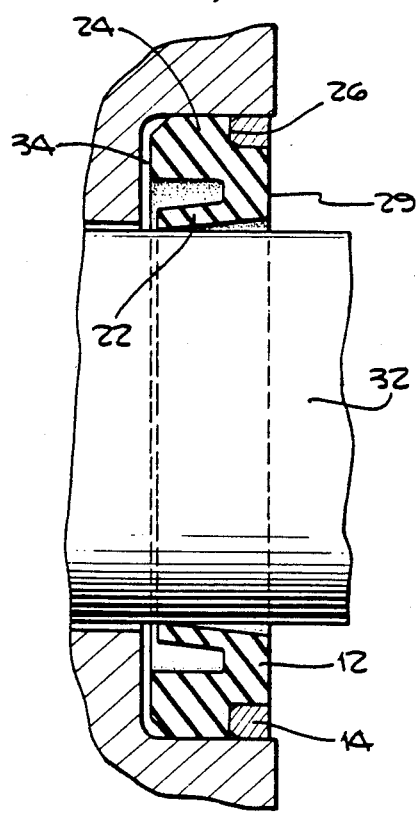
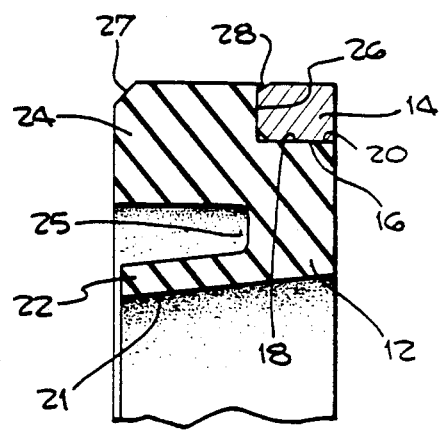

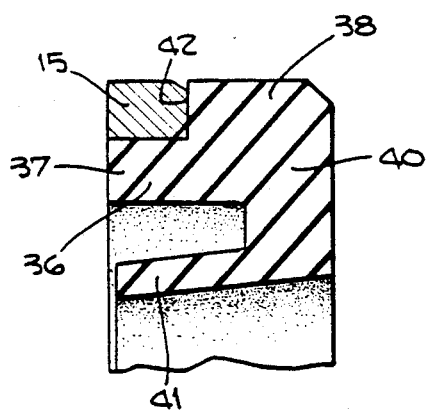
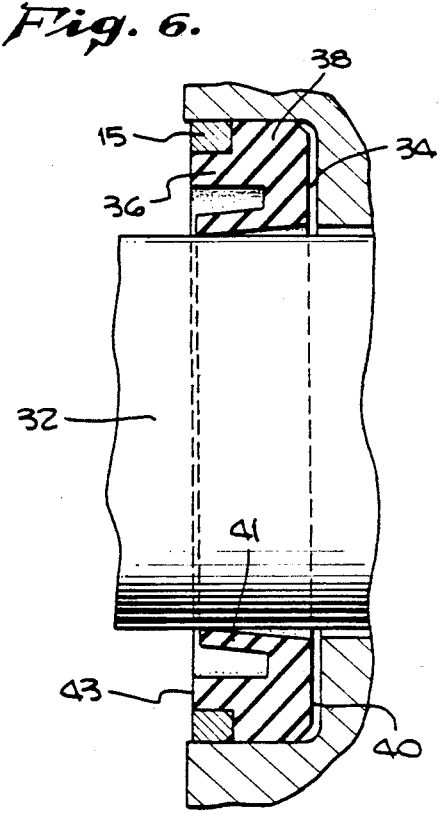
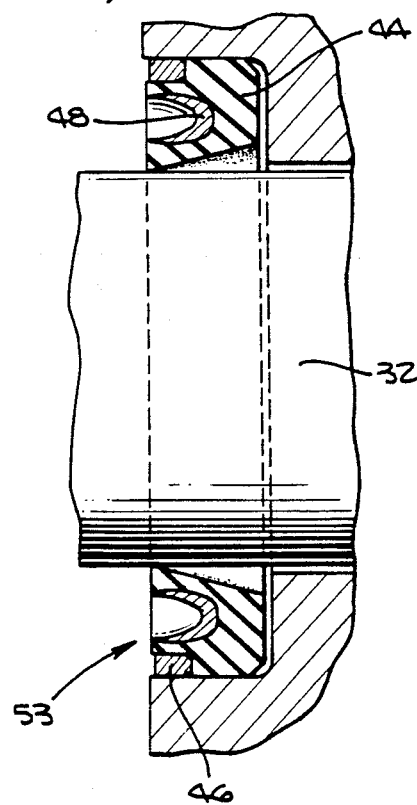
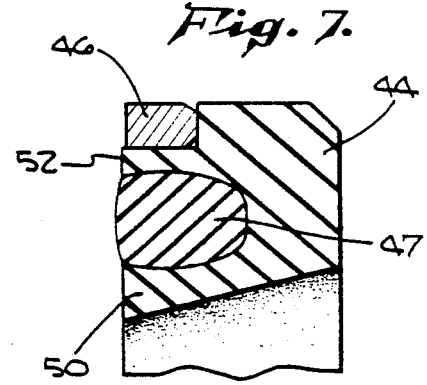

SEAL

BACKGROUND OF THE INVENTION

The invention relates generally to seals. In particular, the invention relates to seals used in transitional areas from, for example, a flange to a pipe.

It is known in the art to provide a seal having an elastomeric shaped ring, which is to be pushed onto a cylindrical circumferential surface and supports itself on the latter by a radially acting sealing surface. The shaped ring has an embedded inner ring, consisting of a chamber portion, likewise to be pushed onto said circumferential surface, and having a sealing chamber which surrounds the shaped ring, has an undersize relative to the outer contour of said shaped ring and conically widens from the open inside diameter of the chamber portion towards one face of the chamber portion. The seal also comprises fastening means which fix the chamber portion with respect to a second component resting against the aforesaid face of the chamber portion.

Such a seal is disclosed by German Utility Model No. 8,436,214. This reference discloses a pipe connection between two pipe ends to be connected abutting one against the other, onto each of which a flange, a clamping element and a chamber portion are loosely pushed and can be braced with respect to one another by a screwed union. A seal in the form of an elastomer shaped ring with an embedded inner ring surrounds the connecting joint and protrudes by its two axial ends into a sealing chamber of the two chamber portions. The flange and chamber portions form between themselves in each case a clamping chamber, into which enters the said clamping element, which supports itself against the pipe end by a radially inner-lying clamping rim, and has, with regard to a radially outer-lying clamping rim, a clamping surface of the clamping chamber engaging over it and protrudes in an axial direction out of the clamping chamber in such a way that an axial compressive force acting on the clamping element results in a decrease in the outside diameter and in a decrease in the inside diameter of the clamping element. The outer circumferential surface of the elastomer shaped ring is designed approximately semicircular, the two outer ring rims of the shaped ring which support themselves against the circumferential surface of the two pipe ends being provided with a radius. This radius is greater than the sum of the plus and minus tolerances of the pipe diameters plus the fitting clearance between the inside diameter of the chamber portions and the largest tolerance of the pipe diameters. Embedded in the elastomer shaped ring is an inner ring of hard and/or plastic material. The outer contour of the shaped ring corresponds approximately to that of the two sealing chambers in the chamber portions, but is oversized, so that a pressing together of the two chamber portions distorts the seal and subjects it to a pressure which is directed axially and radially inward. The inner ring supports itself—just like the elastomer shaped ring—against the circumferential surfaces of the two pipe ends.

With this previously known seal, complete pipe connections or other components are sealed off in an advantageous way provided that pipes or pipe-like components are used for the support of the two radially acting sealing surfaces lying on either side of the inner ring. However, this previously known system is not suitable for the transition from flanges based on flat seals to a pipe connection according to the design described above. This is so in this case because outside the pipe wall there are sealing surfaces which are perpendicular to the pipe axis.

SUMMARY OF THE INVENTION

The object of the present invention is to provide a seal capable of sealing a transitional area from, for example, a flange to a pipe.

Another object of the invention is to provide a seal, capable of sealing transitional areas, of simple and inexpensive design.

A further object of the invention is to provide a seal that can be fitted and removed easily and which may be employed in both pressure and vacuum applications.

These and other objects are achieved according to the present invention by a seal that seals a first surface and a second surface, said seal comprising:

(a) sealing means having a radially acting sealing surface in contact with the second surface, and an axially acting sealing surface in contact with the first surface, for providing a seal between the first surface and the second surface; and (b) chamber means having a chamber that surrounds the sealing means for locating the sealing means with respect to the first and second surfaces and forcing the sealing means into contact with the first and second surfaces.

In a preferred embodiment of the invention the sealing means is comprised of an elastomer shaped ring having an embedded inner ring, the radially acting and axially acting sealing surfaces being annular, and the chamber means being comprised of a ring shaped chamber portion having a sealing chamber which surrounds the shaped ring, the sealing chamber being undersized relative to the outer contour of the shaped ring and widening conically from the inside diameter of the chamber portion toward an outside face of the chamber portion.

It is advantageous here if the outer circumferential surface, joining the two sealing surfaces of the shaped ring to each other, approximately forms a quarter circle segment.

In a preferred embodiment, the open inside diameter of the axially acting annular sealing surface may be greater than the diameter of the radially acting sealing surface. The smallest open inside diameter of the inner ring may be greater than the diameter of the radially acting sealing surface. In this case, there is a clearance in each case between the surfaces to be sealed and the inner ring; the inner ring acts within the shaped ring merely as a support ring. In the region of the two sealing surfaces, the shaped ring adopts the function of the primary seal.

The sealing effect is achieved by tightening one or more fastening means, these fastening means possibly being screws, with which the chamber portion is screwed directly to the cylindrical circumferential surface (pipe, shaft, spindle) and/or to the second component (flange, housing wall). The seal is suitable for sealing off statically employed pipes, rotating shafts and/or axially movable thrust rods and the like with respect to housing walls, provided that the frequencies of motion lie within the permissible friction values of the shaped ring material. The shaped ring consists of a relatively soft elastomer.

The inner ring consists of a harder material, possibly of metal, and is loosely inserted into a matched annular groove of the shaped ring. A pressure medium penetrating between the second component and the cylindrical circumferential surface would thereby result in an increase in the contact pressure of the two sealing surfaces of the shaped ring.

Seals which are used for sealing off rotatingshafts such as, for example, for pumps, compressors or the like, are nowadays still predominantly packings of plastic materials, which in practice are very large and long. For applying the contact pressures, adjustable spacer and/or intermediate rings are required, which are fitted for retention on threads, some of which are on the shafts and some in the housings. Such packings cannot withstand relative movements of the shafts to the housings at all or only very poorly, in particular in cases where meshings of gear wheels produce axial shaftloads and/or torsions of tangential loads. It is known in mechanical engineering ad to users of processing machines for liquid or gaseous media that shaft seals based on packings have to be repeatedly readjusted during their service life to eliminate leaks occurring in the meantime, not only on account of such mechanical effects, but also as a consequence of temperature differences, pressure pulsations and the like. When using shaft seals which are designed as a sealing assembly with a support ring and interposed elastomer rings, an angular combination seal of axial to radial is considered problematical and is therefore not recommended by seal manufacturers. Both for packings and for seal combinations with elastomer rings, there are predominantly installation instructions for the radial area. The seals or seal combinations seal off dimensionally precisely specified bore holes through housings with respect to the shafts passed through. The sealing assembly is in this case located between the housing bore hole and the passed-through shaft.

In comparison, with the seal according to the present invention, shaft seals can be achieved much more simply and with less constructional cost for the shaft bushing. In the housing region, the possible tolerances chosen may be larger; if the shaped ring according to the invention lies firmly against the assigned housing, relatively large peak-to-valley heights or correspondingly low finishing qualities may also be chosen.

In the case of processing machines in which the shaft bearing, for example, a rolling bearing, has to be sealed off, the seal according to the present invention can be used on either side of the housing wall, so that the bearing, which receives the shaft in the housing bore hole, is sealed off on both sides. Such bearing seals are particularly important for, for example, dry-running compressors or pumps, in which the flow medium has to be strictly separated from the bearing. In such arrangements it is irrelevant whether one or both of the seals is or are subjected to under pressure or overpressure.

The structural dimensions of the seal according to the present invention are clearly less than those of the known packings. Fitting and removal of the seals according to the present invention are simpler; the sealing function is more versatile, both in pressure and vacuum applications, particularly in comparison with the plastic sealing material used with packings.

If the cone angle of the sealing chamber of the chamber portion according to the invention—with reference to the axis of symmetry of the sealing chamber—is 45°, approximately equal compressive forces of the two sealing surfaces of the shaped ring are produced in the radial and axial directions. By decreasing this cone angle to, for example, 40°, the radially acting sealing effect can be increased, while an increase in the cone angle to, for example, 50°, results in an increase in the axially acting sealing effect. Altering the cone angle permits the contact pressure differential to be adjusted as a function of the altered numbers of degrees for the cone angle and as a function of the hardnesses of the shaped ring, account having to be taken here of the effects of the tolerances of the components.

It is advantageous, particularly in cases where shafts with high peripheral speeds are to be sealed, if the inner ring completely or partially engages over the radially acting and/or axially acting sealing surface of the shaped ring by a thin walled shaped part. It is advantageous in this case if at least the shaped parts of the inner ring consist of materials which yield under the effect of frictional forces, for example PTFE, or PTFE with carbon fiber fillers, soft metal alloys or the like. The thin-walled shaped parts of the inner ring may also have resilient properties. In the case of all of these embodiments, the inner ring with its shaped parts adopts the function of the primary seal while the elastomer shaped ring serves only as a secondary seal. The alternative solutions presented also provide the possibility, however, of using the shaped ring as a primary seal, for example, with respect to the cylindrical circumferential surface (shaft, pipe, spindle), in which case the inner ring would then merely cover the axially acting sealing surface of the shaped ring by its said shaped part. A converse solution is also conceivable, in which the shaped ring is used exclusively as a primary seal with regard to its axially acting sealing surface. If the said shaped parts of the inner ring are embedded in the two sealing surfaces of the shaped ring without completely covering the two sealing surfaces the shaped ring also acts as a primary seal in the two sealing surfaces with narrow annular areas.

It is advantageous if the inner ring is pressed loosely into a matched annular groove of the shaped ring. In this case, the annular groove receiving the inner ring expediently less with its open side opposite the circumferential surface of the shaped ring. The bottom of the annular groove receiving the inner ring is preferably curved outwardly approximately parallel to the circumferential surface of the shaped ring.

In the embodiments in which the shaped ring adopts the function of the primary seal, an application of pressure is produced between the inner ring and the shaped ring. In the case of the embodiments designed for dynamic use, in which the inner ring acts as primary seal, there is no reliance on an additional supporting of the medium pressure on the seal combination.

Further objects and advantages of the present invention will be understood with reference to the detailed description of the preferred embodiments along with the drawings.

BRIEF DESCRIPTION OF THE DRAWINGS

FIGS. 1a and 1b show a shaped ring with an embedded inner ring, in plan view and in cross-section;

FIGS. 2a and 2b show a chamber portion provided with a bush, in plan view and in cross-section;

FIGS. 3a and 3b show a chamber portion provided with a flange, in plan view and in cross-section;

FIG. 4 shows in cross-section a fitted seal with a chamber portion according to FIG. 3 and a shaped ring and inner ring according to FIGS. 1a and 1b; and FIGS. 5a, 5b, 6a, 6b, 7a, 8a and 8b show, in each case in a representation according to FIGS. 1a and 1b, a shaped ring with an inner ring modified in each case.

DETAILED DESCRIPTION OF THE PREFERRED EMBODIMENTS

Figure 11:
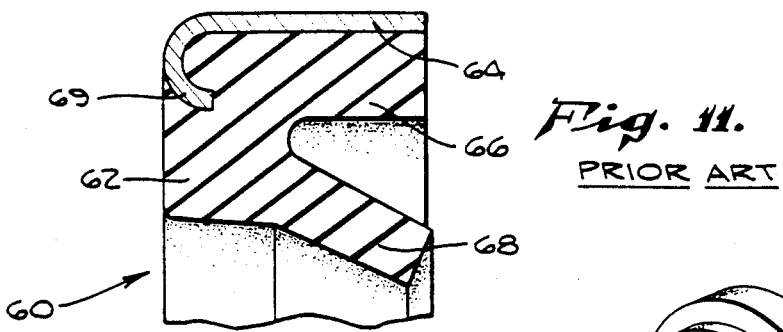
Figure 9:
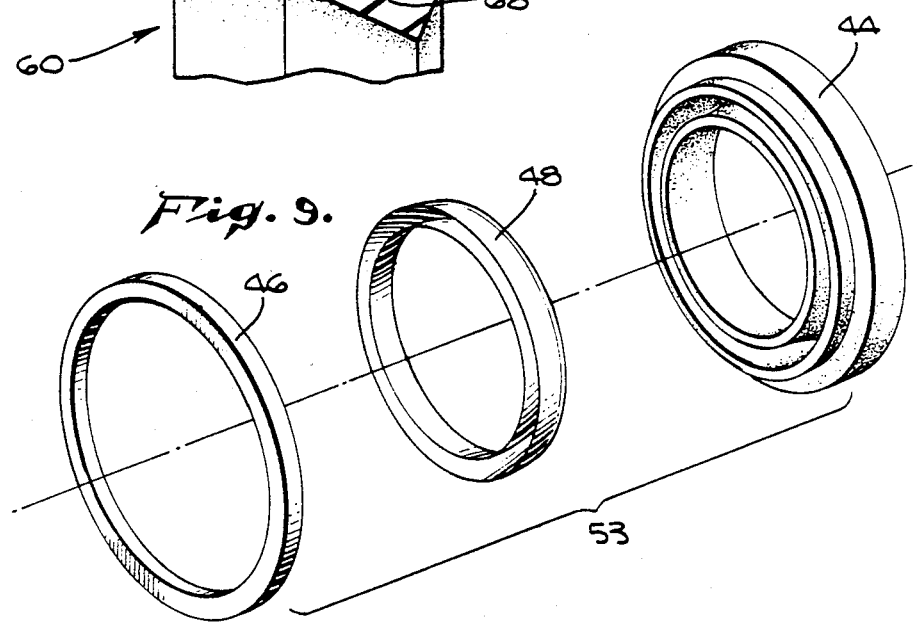
Figure 10:
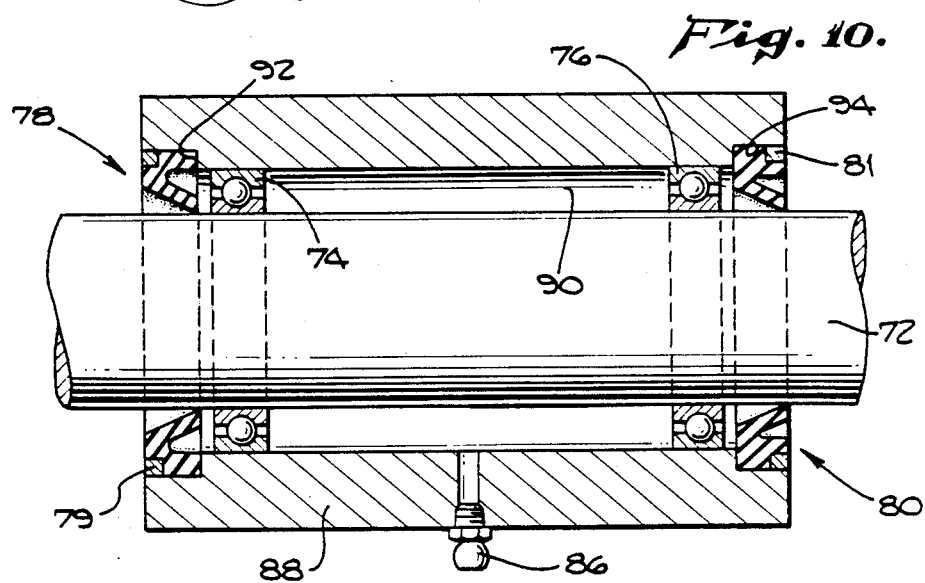

FIGS. 1a and 1b shows an elastomer shaped ring 1 with an embedded inner ring 2. The shaped ring 1 has a radially acting sealing surface 3 and an axially acting sealing surface 4 arranged at right angles to the latter. The outer circumferential surface 5 of the shaped ring 1, joining the two sealing surfaces 3, 4 to each other, approximately forms a quarter circle segment. The clear inside diameter $d_{ax}$ of the axially acting annular sealing surface 4 is greater than the diameter $d_r$ of the radially acting sealing surface 3. The smallest clear inside diameter $d_I$ of the inner ring 2 is greater than the diameter $d_r$ of the radially acting sealing surface 3. The shaped ring 1 forms a narrow annular radial surface and axial surface 7,8 between the visible inner circumferential surface 6 of the inner ring 2, opposite the convex circumferential surface 5 of said shaped ring and its two sealing surfaces 3, 4.

FIGS. 2a, 2b, 3a and 3b each show a chamber portion 9 with a sealing chamber 10, which conically widens from the clear inside diameter $d_K$ of the chamber portion 9 toward one face 11 of the chamber portion. In the case of the embodiment according to FIG. 2, the chamber portion 9 has, on the side turned away from the sealing chamber 10, a bushing 12 with radially running recesses 13 for fastening means (not shown) with respect to a cylindrical circumferential surface 14 (see FIG. 4), which may be a pipe, a shaft or spindle.

In the case of the embodiment according to FIGS. 3a and 3b the chamber portion 9 bears on its face 11 having the largest opening of the sealing chamber 10 a flange 15 with axially running recesses 16 for fastening means (not shown) with respect to a second component 17 (see FIG. 4).

FIG. 4 shows a fitted seal consisting of the shaped ring 1 with embedded inner ring 2 according to FIGS. 1a and 1b and the chamber portion 9 according to FIGS. 3a and 3b. Shaped ring 1 and chamber portion 9 are pushed onto a shaft forming the said cylindrical circumferential surface 14, the shaped ring 1 supporting itself on this shaft by its radially acting sealing surface 3. The shaped ring 1 completely enters the sealing chamber 10 of the chamber portion 9 and supports itself against the second component 17, which may, for example, be a flange of a housing, by its axially acting sealing surface 4. The inner contour of the sealing chamber 10 is undersized relative to the outer contour of the shaped ring 1, so that when the fastening means 18, shown only by dot-dashed lines in FIG. 4, are tightened, the shaped ring 1 is deformed between chamber portion 9 and second component 17 to such an extent that it is held by tension over its surface against the conical wall of the sealing chamber 10. The conicity of the sealing chamber 10 causes a force acting in the radial and axial directions to be exerted on the shaped ring 1 during tightening of the fastening means 18. These force components are approximately equal in size if the cone angle $\alpha$ of the sealing chamber 10—with reference to the axis of symmetry 19 of the chamber portion 9—is 45°. With an angle $\alpha<45°$, there is a reinforcement of the radially acting sealing effect, while a cone angle $\alpha>45°$ results in a reinforcement of the axially acting sealing effect.

In the case of the embodiment according to FIGS. 1a and 1b or FIG. 4, the elastomer shaped ring 1 acts as primary seal. The inner ring 2 acts as a support ring, without coming into contact with the surfaces to be sealed. For certain fields of application, embodiments in which the inner ring 2 adopts the function of the primary seal while the shaped ring 1 represents a secondary seal appear expedient. Thus, FIGS. 5a and 5b show an inner ring 2 which completely engages over the radially acting sealing surface 3 and the axially acting sealing surface 4 of the shaped ring 1, in each case by a thin-walled shaped part 20,21. The shaped parts 20,21 are in this case also drawn somewhat into the region of the convex circumferential surface 5 of the shaped ring 1 and thereby form a support for the elastomer shaped ring 1 and prevent the shaped ring from coming directly into contact by its sealing surfaces 3,4 with the surfaces to be sealed. The detailed representation X on an enlarged scale reveals that the said shaped parts 20,21 of the inner ring 2 have a profiled sealing surface 22. The shaped parts 20,21 preferably consist of materials which yield under the effect of frictional forces.

FIGS. 6a and 6b show an inner ring 2 which, as a modification of the embodiment shown in FIGS. 5a and 5b covers the radially acting sealing surface 3 of the shaped ring 1 only with one shaped part 20. In the case of the embodiment according to FIGS. 7a and 7b, the inner ring 2 is provided only with one shaped part 21, which exclusively covers the axially acting sealing surface 4 of the shaped ring 1.

The embodiment represented in FIGS. 8a and 8b corresponds in principle to that of FIGS. 5a and 5b. However, in this case the shaped parts 20,21 of the inner ring 2 do not cover the entire sealing surfaces 3,4 of the shaped ring 1. Rather, the shaped parts 20, 21 are inset flush with the sealing surfaces 3,4, so that the shaped ring 1 with narrow annular regions 3a, 4a acts as the primary seal.

What is claimed is:

1. A device for providing a seal between a first surface and a second surface, said device comprising:
   (a) sealing means having an annular radially acting sealing surface in contact with said second surface, and an annular axially acting sealing surface in contact with said first surface, for providing a seal between said first surface and said second surface; said sealing means being comprised of an elastomer shaped ring having an embedded inner ring, an outer circumferential surface joining said radially acting and axially acting sealing surfaces of said shaped ring to each other approximately forming a quarter circle segment;
   (b) chamber means for locating said sealing means with respect to said first and second surfaces and forcing said sealing means into contact with said first and second surfaces; said chamber means being comprised of a ring shaped chamber portion having a sealing chamber which surrounds said shaped ring; said sealing chamber being undersized relative to the outer contour of said shaped ring and widening conically from the inside diameter of said chamber portion toward an outside face of said chamber portion.

2. A device as claimed in claim 1 further comprising fastening means for securing said chamber means to said first surface.

3. A device as claimed in claim 1, wherein an inside diameter of said axially acting annular sealing surface is greater than the diameter of said radially acting sealing surface.

4. A device as claimed in claim 1, wherein the smallest clear inside diameter of said inner ring is greater than the diameter of said radially acting sealing surface.

5. A device as claimed in claim 4, wherein said shaped ring forms a narrow annular radial surface and axial surface between the inner circumferential surface of said inner ring, opposite said outer circumferential surface of said shaped ring, and said radially acting and axially acting sealing surfaces.

6. A device as claimed in claim 1, wherein the conical angle of said sealing chamber is, with respect to its axis of symmetry less than 45°, for reinforcement of the radially acting sealing effect.

7. A device as claimed in claim 1, wherein the conical angle of said sealing chamber is, with respect to its axis of symmetry greater than 45°, for reinforcement of the axially acting sealing effect.

8. A device as claimed in claim 1, wherein said chamber portion has, on a side turned away from said sealing chamber, a bushing with radially running recesses for providing fastening means with respect to said second surface.

9. A device as claimed in claim 1, wherein said chamber portion bears on its face having the largest opening of said sealing chamber a flange with axially running recesses for providing fastening means with respect to the said first surface.

10. A device as claimed in claim 1, wherein said inner ring is embedded in an annular groove between said radially acting and axially acting sealing surfaces and completely or partially engages over said radially acting and/or axially acting sealing surfaces of said shaped ring by a thin-walled shaped part.

11. A device as claimed in claim 10, wherein said shaped part of said inner ring consists of material which yields under the effect of frictional forces.

12. A device as claimed in claim 11, wherein said shaped part of said inner ring has a profiled sealing surface.

13. A device as claimed in claim 1, wherein said inner ring is pressed loosely into a matched annular groove of said shaped ring.

14. A device as claimed in claim 13, wherein said annular groove receiving said inner ring has its open side facing said circumferential surface of said shaped ring.

15. A device as claimed in claim 14, wherein the bottom of said annular groove receiving said inner ring is curved outward approximately parallel to said circumferential surface of said shaped ring.

16. A seal device capable of engaging the outer perimeter of a cylindrical circumferential surface in sealing relationship, comprising a shaped elastomer ring having, in its uncompressed condition, an axially acting annular sealing surface and a radially acting annular sealing surface, an inner ring embedded in said elastomer ring between said axially and radially acting sealing surfaces and having a visible inner circumferential surface, chamber means surrounding said elastomer ring having a conically shaped chamber therein that is undersized relative to the outer contour of said elastomer ring and which is adapted to receive said elastomer ring, said elastomer ring being adapted to contact with cylindrical circumferential surface when said seal device is in sealing engagement therewith, means abutting the axially acting sealing surface of said elastomer ring and said chamber means, and fastening means for fastening said chamber means to said abutting means, whereby the radially acting sealing surface of said elastomer ring may be urged into sealing contact with said cylindrical circumferential surface.

* * * * *